United States Patent
Benveniste

[11] Patent Number: 5,960,339
[45] Date of Patent: Sep. 28, 1999

[54] ANALOG-TO-DIGITAL TRANSITION: SELECTING THE OPTIMAL CELLULAR RADIO MIX

[75] Inventor: Mathilde Benveniste, South Orange, N.J.

[73] Assignee: AT & T Corp, New York, N.Y.

[21] Appl. No.: 08/868,403

[22] Filed: Jun. 3, 1997

[51] Int. Cl.$^6$ .................................................. H04M 15/00
[52] U.S. Cl. ........................ 455/406; 455/453; 455/552; 455/553
[58] Field of Search ...................................... 455/406, 453, 455/446, 552, 553, 575; 375/222, 216

[56] References Cited

U.S. PATENT DOCUMENTS

| | | | |
|---|---|---|---|
| 5,870,427 | 2/1995 | Tiedeman, Jr. et al. ................. | 375/216 |
| 5,870,676 | 2/1996 | Durvasula et al. ..................... | 455/450 |
| 5,878,078 | 3/1996 | Griffin et al. ............................ | 375/222 |
| 5,881,376 | 12/1995 | Lundberg et al. .................... | 455/226.1 |

OTHER PUBLICATIONS

R.B. Cooper, "Introduction to Queueing Theory", Macmillan Co., New York, 1972, Chapters 3,4,5, pp. 63–203.
Y.Rapp, "Planning of Junction Network in a Multiexchange Area", Ericsson Technics, 20, No. 1, pp. 77–130, 1964 (See "AA, Introduction to Queueing Theory–R. Cooper".).

Primary Examiner—Wellington Chin
Assistant Examiner—Congvan Tran
Attorney, Agent, or Firm—Alfred G. Steinmetz

[57] ABSTRACT

In a transition phase of a cellular cell from analog-to-digital radio service it must be determined how many of the base station radios in a cell must be changed over from analog to digital, given the proportion of mobile phones with dual-mode capability to analog phones. A dual-mode mobile phone has the capability to interface with both analog and digital radios. In determining the radio mix, it is desirable to maximize the call handling capacity of a cell, or minimize the blocking experienced by the mobile subscribers. To address these questions, an analytical model is developed to compute the blocking rate experienced by mobile callers in a cell, given the cell's offered load, the mix of analog and dual-mode mobiles, and the analog-digital split of the RF channels available to the cell. The model's results enable selection of the channel split that gives the lowest blocking rate, and to compile charts that show the relationship between the proportion of dual-mode mobiles, the number of digital radios in a cell, and the maximum offered load that can be served at a specified blocking rate.

7 Claims, 3 Drawing Sheets

ANALOG-TO-DIGITAL TRANSITION: SELECTING THE OPTIMAL CELLULAR RADIO MIX

FIELD OF THE INVENTION

This invention relates to wireless communication systems and in particular cellular telephone systems in which both dual-mode mobiles (e.g., analog and digital) and analog mobiles are served within a common serving area. It is specifically concerned with an analog radio system in transition to a digital TDMA system which in transition from analog to digital is presently serving both dual-mode and analog mobiles and in particular to a method of operating to reduce overall blocking within a serving area.

BACKGROUND

The introduction of digital cellular telephony brings with it the potential for a significant capacity increase as digital TDMA technology can accommodate several conversations in the bandwidth used for one conversation by analog technology. The full capacity increase will not be realized, however, unless all subscribers own mobile phones with digital TDMA capability. Until then, it is expected that analog and digital technology will co-exist, achieving less than the ultimate capacity gains. The gains realized will depend on the number of radios changed over to digital. It is possible to have no capacity gains, and even losses, if too many system radios have been changed over.

SUMMARY OF THE INVENTION

The question that must be answered for the transition phase is: How many of the radios in a cell must be changed over from analog to digital, given the proportion of mobile phones with dual-mode capability—the capability to interface with both analog and digital radios. In determining the radio mix, one might wish to maximize the call handling capacity of a cell, or minimize the blocking experienced by the mobile subscribers. To address these questions, an analytical model is developed to compute the blocking rate experienced by mobile callers in a cell, given the cell's offered load, the mix of analog and dual-mode mobiles, and the analog-digital split of the RF channels available to the cell. The model's results enable selection of the channel split that gives the lowest blocking rate, and to compile charts that show the relationship between the proportion of dual-mode mobiles, the number of digital radios in a cell, and the maximum offered load that can be served at a specified blocking rate.

Therefore, in accord with the invention, a method is provided for determining optimal proportion of digital and analog base station serving radios in a cell or serving area to minimize blocking. Another objective may be to achieve an increase in available traffic service.

To compute blocking experienced in a cell containing both analog and digital radios, the two types of radios are each represented as a queueing system consisting of two server groups. Two independent streams of calls are directed to the two server groups. They consist of calls initiated by the analog mobiles and the calls initiated by the dual-mode mobiles. The two call streams are assumed to be Poisson distributed (call durations are exponentially distributed and are independent of each other and of the rate of call generation). The load for each stream depends on the total load offered in the cell and the proportion of analog and dual-mode mobiles.

DETAILED DESCRIPTION

It is desirable to know in advance the number of mobiles that a cell, serving a TDMA system, may be designed to handle with a defined probability of blocking. In TDMA cells handling both analog mobiles and digital mobiles (i.e., dual-mode) such information may be computed and used in design of the cell capacity for low blocking and high capacity usage for a given number of mobiles of each designation.

Figure 1:
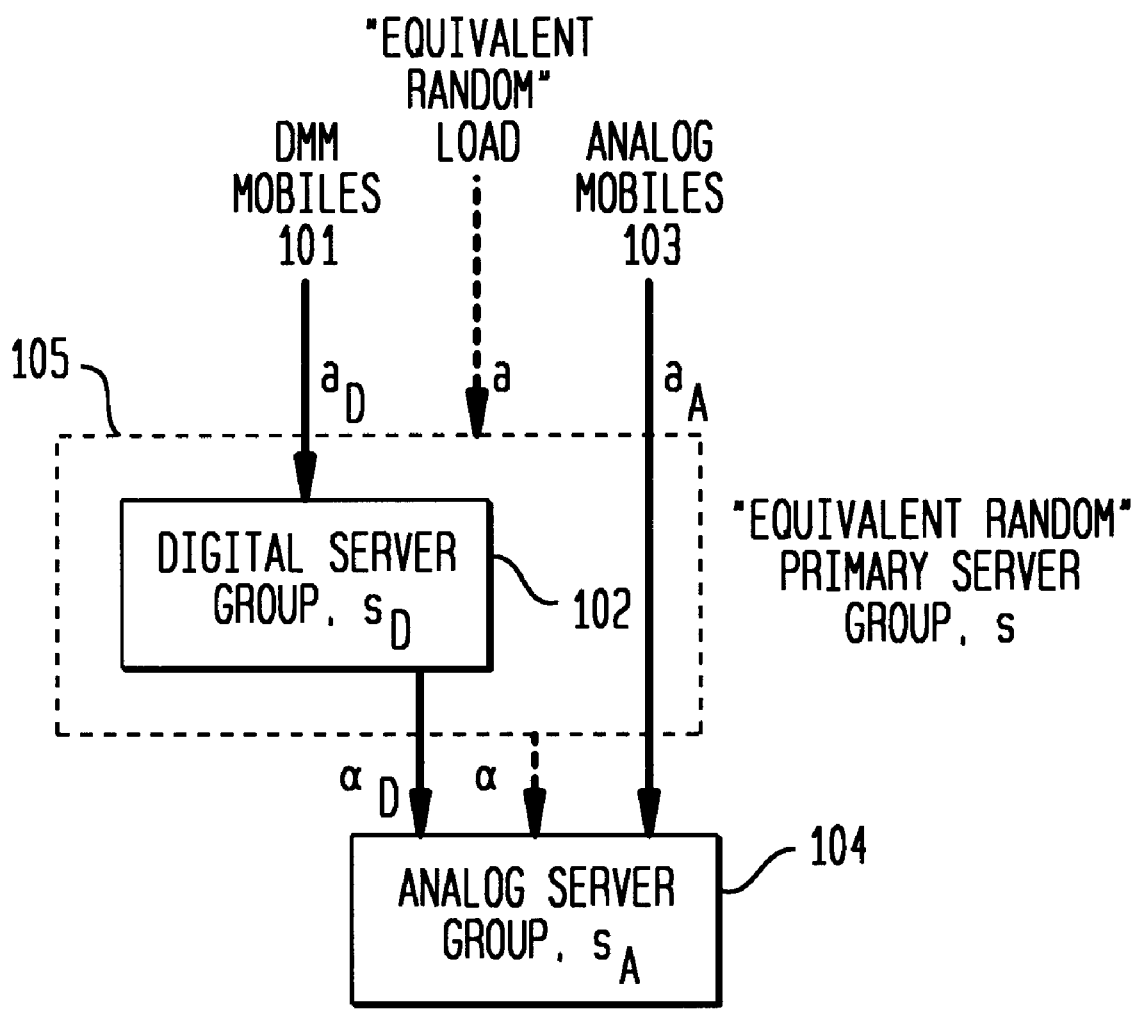
FIG. 1 is a schematic of a relationship between traffic streams and server groups in a cell or service area containing both analog and digital mobiles to be serviced.

A schematic of a cell serving both digital and analog mobiles is as shown in the FIG. 1. In that setting a plurality of dual-mode mobiles 101 (with an offered load of $a_D$) are served by a digital server 102 group having a plurality of digital radios. Dual-mode mobiles have both digital and analog transmission/reception capability within the mobile. Analog mobiles 103 (with an offered load of $a_A$) are served by an analog server 104 which does not have any digital transmission or reception capability. As shown the digital server 102, which is included in a primary server group 105 category, allows digital overflow $a_D$ to reformulate as service requests to the analog server group 104. The combined load (Equivalent Random Load $\alpha$) handled in this fashion is handled as if by an "Equivalent Random Primary Server Group" 105. Equivalent Random Load $\alpha$ which is determined as discussed below becomes the stream $\alpha$ applied to the analog server group $S_A$ 104. $\alpha$ comprises the $\alpha_D$ overflow passed by equivalent server 105 through the digital server group $S_D$ and to server group $S_A$.

Queueing Model

To compute the blocking experienced in a cell containing both analog and digital radios, we represent the two types of radios as a queuing system consisting of two server groups. Two independent streams of calls are directed to the two server groups. They consist of the calls initiated by the analog mobiles and the calls initiated by the dual-mode mobiles. The two streams are assumed to be Poisson distributed (call durations are exponentially distributed and are independent of each other and of the rate of call generation). The load for each stream will depend on the total load offered in the cell and the proportion of analog and dual-mode mobiles.

FIG. 1 illustrates the relationship between the traffic streams and server groups. The digital server group receives calls from dual-mode mobiles only. If any of these calls find all digital radios busy, they are directed toward the analog server group, which, in addition to the overflow from the digital server group, receives also the calls from the analog mobiles.

The blocking probability $P_S$ for the system, $P_D$ for the dual-mode mobiles, and $P_A$ for the analog mobiles can be computed. Given $a_D$ dual-mode mobile offered load $a_A$ analog mobile offered load $S_D$ number of digital radios $S_A$ number of analog radios The above blocking probabilities are computed using the following relationships. $P_A$ is equal to the probability $B_A$ that a call reaching the analog server group will find all analog radios busy. That is, $$P_A = B_A \tag{1}$$

$P_D$ is equal to the probability that a dual-mode mobile call will find both the digital and the analog server groups busy. Hence, $$P_D = B_A B_D \tag{2}$$

where $B_D$ is the probability that all digital radios are busy. The system blocking probability $P_S$ is equal to the ratio of the combined blocked load over the combined offered load. That is, $$P_S = \frac{(\alpha_D + a_A) B_A}{a_D + a_A} = \frac{(a_D B_D + a_A) B_A}{a_D + a_A} \tag{3}$$

where $\alpha_D$ is the dual-mode load blocked at the digital server group.

To compute the desired probabilities requires knowing $B_A$ and $B_D$, the blocking probability at the analog and digital server groups, respectively. The probability $B_D$ is computed through the use of the Erlang loss formula B (s, a), where s is the number of servers and a the offered load. Given $S_D$ radios in the digital group and an offered load $a_D$, the blocking probability $B_D$ is $$B_D = B(s_D, a_D) = \frac{a_D^{s_D}/s_D!}{\sum_{k=0}^{s_D} (a_D^k / k!)} \tag{4}$$

The computation of the probability $B_A$ is more complex. Even though the original traffic streams are Poisson, the input to the analog server group is not, because it contains the overflow from the digital server group, which (overflow) is not Poisson. Hence, an equivalent approximate method was employed to calculate the blocking probability at the analog server group.

The Equivalent Random Method

Our analysis is based on a technique known in teletraffic engineering as the equivalent random method. The queuing system at hand is represented as an equivalent simple overflow system with one primary and one overflow server group, as illustrated in FIG. 1. The analog server group is the overflow group. The two inputs going into the analog server group are combined and represented as the overflow from a single "equivalent random" primary server group, receiving a single "equivalent random" load. The size s of the equivalent random primary server group and the equivalent random offered load a are the two parameters used to make the two systems equivalent. The two systems will be equivalent if the first two moments of the input to the analog server group are the same. That is, the mean $\alpha$ and the variance $v$ of the total load offered to the analog server group must be the same in the original and in the equivalent random system. As a result, the blocking probability at the analog server group will be the same for the two equivalent systems. $B_A$ is evaluated using the equivalent random system.

Values for s and a are initially determined that will render the two queuing systems equivalent. To this end, expressions are written for $\alpha$ and $v$ in the two systems and then are equated.

In the original system the input to the analog server group consists of two independent streams, the overflow from the digital server group and the analog traffic stream. Due to this independence, its mean and variance can be computed as follows:

$$\alpha = \alpha_D + a_A \tag{5}$$

$$v = v_D + a_A \tag{6}$$

where $\alpha_D$ and $v_D$ are the mean and variance of the digital overflow. Their values are given by $$\alpha_D = a_D B(s_D, a_D) \tag{7}$$

$$v_D = \alpha_D \left(1 - \alpha_D + \frac{a_D}{s_D + 1 + \alpha_D - a_D}\right) \tag{8}$$

where $a_D$ is the dual-mode offered load, and $S_D$ is the number of digital radios. $a_A$ is the analog offered load. As a Poisson traffic stream, the variance of the analog offered load will be equal to its mean.

In the equivalent random system the mean and variance of the overflow are given by the following:

$$\alpha = a \, B(s, a) \tag{9}$$

$$v_D = \alpha \left(1 - \alpha + \frac{a_D}{s + 1 + \alpha - a}\right) \tag{10}$$

By first computing $\alpha$ and $v$ with equations (5) through (8), one can then use equations (9) and (10) to solve for the equivalent random group size s and the equivalent random load a.

Given s and a, one can calculate the blocking probability $B_A$ at the analog server group. In the equivalent random system, $B_A$ is the conditional probability that a call blocked at the primary equivalent random server group will find all servers in the overflow group busy. The blocking probability at the primary server group will be B(s, a). The overall blocking probability will be B $(s+S_A, a)$, where $S_A$ is the number of analog radios. Using the definition of conditional probability. we have $$B_A = \frac{B(s + s_A, a)}{B(s, a)} \tag{11}$$

Approximate Solution for the Parameters of the Equivalent Random System

Solution of equations (9) and (10) for s and a was achieved by using Rapp's method [3]. Rapp observed that a good solution to equations (9) and (10) can be obtained by combining with (10) the following equation:

$$a = v + 3z \, (z-1) \tag{12}$$

where the peakedness factor z is defined as $$z = \frac{v}{\alpha} \tag{13}$$

This observation leads to the following solution procedure.

Algorithm for s and a

Step 1—compute $\alpha$ and $v$ using equations (5) through (8).

Step 2—compute z

Step 3—Compute a using equation (12).

Step 4—Find s by inverting equation (10).

$$s = \frac{a(\alpha + z)}{\alpha + z - 1} - \alpha - 1$$

Step 5—Find an integer value for s by truncating the value computed in Step 4 to its integral part.
Step 6—Compute a new value for a from equation (10), which is now solved for a in terms of the integer s and z.

$$a = \frac{(s + \alpha + 1)(\alpha + z - 1)}{\alpha + z}$$

Having obtained values for s and a, $B_A$ is computed using equation (11). With $B_A$ and $B_D$ [equation (4)] known, one can find the probabilities $P_A$, $P_D$, and $P_S$ using equations (1), (2), and (3), respectively.

RESULTS

The formulas presented in the preceding section were applied to a sample problem. We considered a cell assigned a set of 19 RF channels, experiencing a 5 per cent blocking rate when all channels were assigned to analog radios. The offered load was 14.3 erlangs. Assuming different values for the proportion of dual-mode mobiles, we computed the blocking probability experienced by the entire mobile population and by the dual-mode and analog mobiles separately, for a different split of the available channels between analog and digital.

Figure 2:
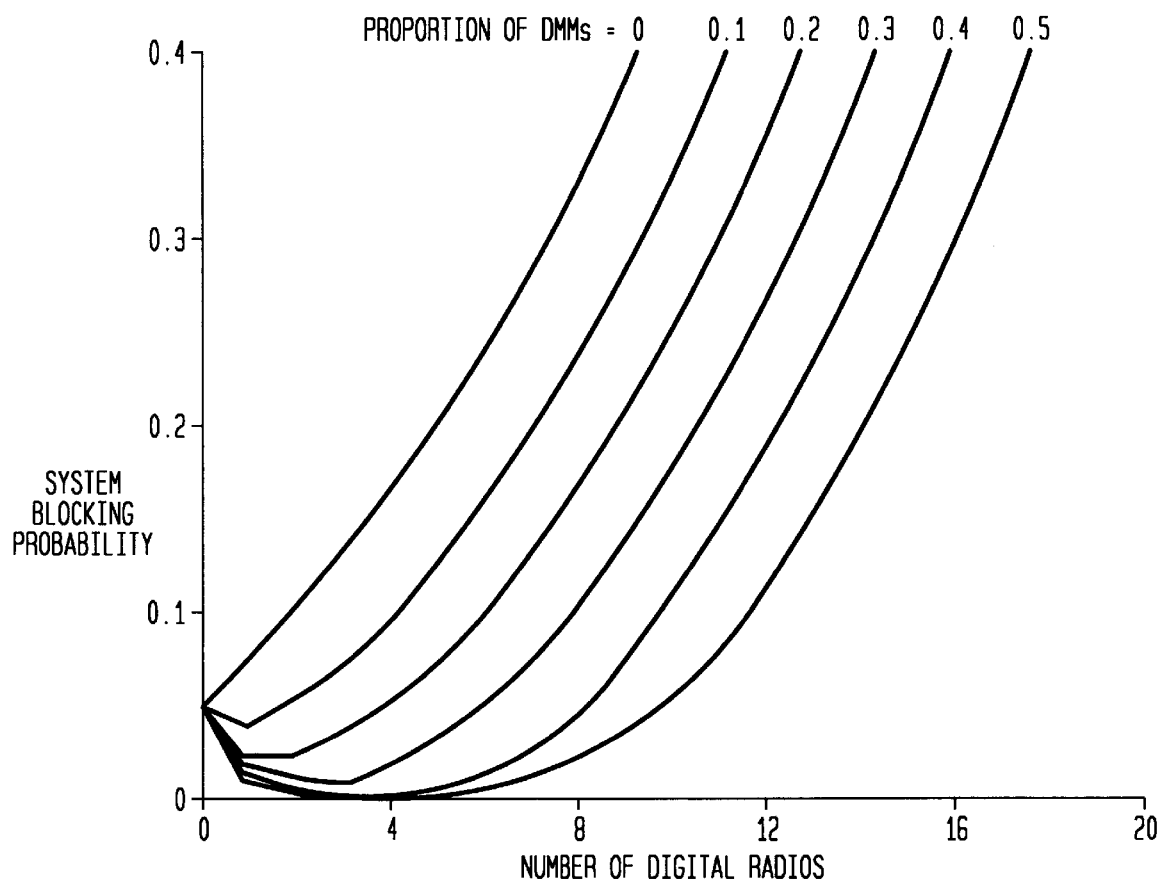
FIGS. 2, 3 and 4 are charts illustrating cell blocking probability for various mixes of analog and digital dual-mode mobiles.

The results appear in Tables 1 through 6 and in FIG. 2. In each of the tables, column 1 gives the number of digital radios, which ranged from 0 to 19. Column 2 is the blocking probability for all mobiles, column 3 is the blocking experienced by the dual-mode mobiles, and column 4 is the blocking experienced by the analog mobiles. We observe that dual-mode blocking is always less than analog mobile blocking, as we expected from equations (1) and (2). FIG. 2 shows the blocking rate experienced by all mobiles as a function of digital radios for different proportions of dual-mode mobiles.

The analog mobile blocking probability is equal to the analog server group blocking probability. The dual-mode blocking probability is equal to the analog server group blocking probability times a number less than one. Hence, the dual-mode blocking would be lower than that experienced by the analog mobiles.

The overall blocking probability experienced by the total mobile population lies between the dual-mode and analog mobile blocking probabilities.

In the presence of some dual-mode mobiles, the system blocking probability will decrease at first as channels switch over from analog to digital radios due to the capacity increase this conversion implies. This blocking decrease is the result of a combination of two effects: a monotonic decrease in dual-mode blocking, and an initial decrease in analog blocking followed by a subsequent increase as the analog-to-digital conversion persists. Consequently, the decrease in overall blocking stops when the higher analog blocking more than compensates for any decrease in digital blocking.

Table 7 shows the number of digital radios that would minimize blocking for different values of the proportion of dual-mode mobiles. As the proportion of dual-mobiles increases, the number of digital radios that minimizes system blocking probability increases, and the blocking probability decreases.

Capacity Reference Charts

The results of the preceding section illustrate the capability of the derived model to compute blocking probabilities for a variable mix of analog and digital radios, given the offered load and the proportion of dual-mode mobiles. In designing a cellular system, one would be interested in the maximum offered load that could be handled with a specified blocking probability. This load is referred to as the load capacity. For this reason, we have compiled charts showing the relationship between load capacity, the number of digital radios, and the proportion of dual-mode mobiles, assuming that the desired blocking probability is 2 per cent. We considered two cases, which differed by the number of channels available to the cell. In the first case there was a set of 19 channels available, and in the second 38 channels.

Figure 3:
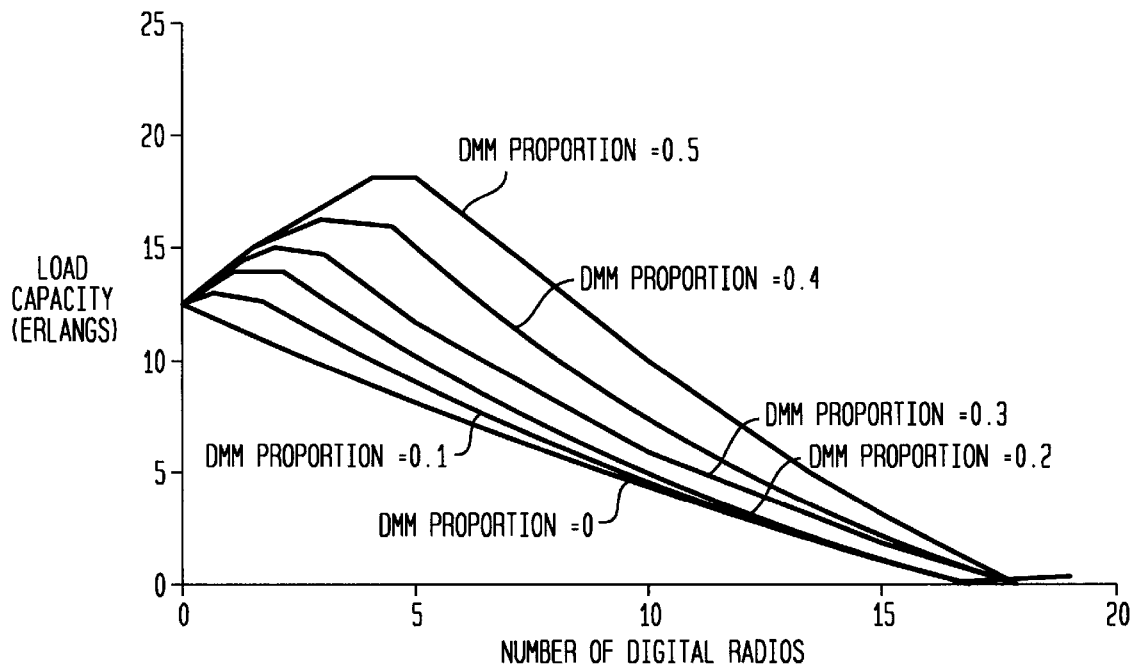

The capacity charts were generated by the sequential application of the model. Blocking probabilities were computed for various offered loads. The capacity was found through interpolation, by equating the blocking probability to 0.02. The charts appear in FIGS. 3, and 4. FIG. 3 gives the capacity for a cell with 19 channels; and FIG. 4, for a cell with 38 channels. Examining the two charts we observe that, for a given proportion of dual-mode mobiles, capacity increases with the number of digital radios up to a certain maximum value, after which it decreases. This is due to the increased blocking experienced by analog mobiles when too many analog radios are replaced by digital.

The maximum attainable capacity will increase with the proportion of dual-mode mobiles. To achieve the maximum capacity gain in the absence of digital capability, one would have to triple the number of channels available to the cell. For a lower proportion of dual-mode mobiles, the capacity gain would be lower, but significant. For instance, a cell with 19 channels and 30 per cent dual-mode mobiles would need only 2 digital radios in order to enjoy a capacity of 14.8 erlangs, which represents a 21 per cent increase relative to the all-analog case. For the same dual-mode mobile proportion, a cell with 38 channels would require 5 digital radios to achieve a capacity of 35.6 erlangs, which represents a 24 per cent increase.

CLOSING REMARKS

Analytical expressions have been derived to give the blocking probability experienced by mobile callers in a cell equipped with both digital and analog radios. We made the following observations concerning the behavior of blocking probabilities.

The blocking experienced by dual-mode mobiles decreases as the number of digital radios increases. A limited conversion of analog-to-digital radios causes a decrease in analog blocking as well, but eventually analog blocking will increase. Hence, the installation of too many digital radios could lead to capacity loss. Dual-mode mobiles experience always a lower blocking than analog mobiles. The overall blocking decreases with an increasing presence of dual-mode mobile phones and the right number of digital radios at the cell site.

To facilitate growth planning of cellular systems, we have compiled capacity charts for two channel allocations: 19 and 38 channels in a cell. These charts show the maximum capacity attainable for a given proportion of dual-mode mobiles as a function of the number of digital radios in a cell. The impact of TDMA technology on capacity depends on the proportion of dual-mode mobiles in the subscriber population. We observe that, while the attainment of the maximum capacity increase (which is equivalent to a threefold spectrum increase under analog technology) requires a full change-over from analog-to-digital technology, a limited change-over could generate noticeable capacity gains. For instance, a cell with 19 channels requires only 2 digital radios to achieve a 21 per cent capacity increase, assuming a 30 per cent proportion of dual-mode mobiles.

| No. of Digital Radios | System Blocking | DMM Blocking | Analog Blocking |
|---|---|---|---|
| "Blocking Probabilities for Proportion of DMMs = 0" | | | |
| 0 | 0.050 | 0 | 0.050 |
| 1 | 0.070 | 0 | 0.070 |
| 2 | 0.094 | 0 | 0.094 |
| 3 | 0.124 | 0 | 0.124 |
| 4 | 0.158 | 0 | 0.158 |
| 5 | 0.197 | 0 | 0.197 |
| 6 | 0.239 | 0 | 0.239 |
| 7 | 0.286 | 0 | 0.286 |
| 8 | 0.336 | 0 | 0.336 |
| 9 | 0.388 | 0 | 0.388 |
| 10 | 0.443 | 0 | 0.443 |
| 11 | 0.500 | 0 | 0.500 |
| 12 | 0.559 | 0 | 0.559 |
| 13 | 0.619 | 0 | 0.619 |
| 14 | 0.680 | 0 | 0.680 |
| 15 | 0.743 | 0 | 0.743 |
| 16 | 0.806 | 0 | 0.806 |
| 17 | 0.870 | 0 | 0.870 |
| 18 | 0.935 | 0 | 0.935 |
| 19 | 1.000 | 0 | 1.000 |
| "Blocking Probabilities for Proportion of DMMs = 0.1" | | | |
| 0 | 0.050 | 0.050 | 0.050 |
| 1 | 0.040 | 0.005 | 0.044 |
| 2 | 0.053 | 0.0 | 0.059 |
| 3 | 0.075 | 0.0 | 0.083 |
| 4 | 0.101 | 0.0 | 0.112 |
| 5 | 0.132 | 0.0 | 0.147 |
| 6 | 0.169 | 0.0 | 0.188 |
| 7 | 0.210 | 0.0 | 0.233 |
| 8 | 0.255 | 0.0 | 0.283 |
| 9 | 0.303 | 0.0 | 0.337 |
| 10 | 0.355 | 0.0 | 0.394 |
| 11 | 0.409 | 0.0 | 0.454 |
| 12 | 0.466 | 0.0 | 0.517 |
| 13 | 0.524 | 0.0 | 0.582 |
| 14 | 0.584 | 0.0 | 0.649 |
| 15 | 0.645 | 0.0 | 0.717 |
| 16 | 0.708 | 0.0 | 0.786 |
| 17 | 0.771 | 0.0 | 0.857 |
| 18 | 0.835 | 0.0 | 0.928 |
| 19 | 0.900 | 0.0 | 1.000 |
| "Blocking Probabilities for Proportion of DMMs = 0.2" | | | |
| 0 | 0.050 | 0.050 | 0.050 |
| 1 | 0.028 | 0.011 | 0.032 |
| 2 | 0.027 | 0.002 | 0.033 |
| 3 | 0.039 | 0.0 | 0.048 |
| 4 | 0.056 | 0.0 | 0.070 |
| 5 | 0.079 | 0.0 | 0.099 |
| 6 | 0.108 | 0.0 | 0.135 |
| 7 | 0.141 | 0.0 | 0.177 |
| 8 | 0.180 | 0.0 | 0.225 |
| 9 | 0.223 | 0.0 | 0.279 |
| 10 | 0.270 | 0.0 | 0.338 |
| 11 | 0.321 | 0.0 | 0.454 |
| 12 | 0.375 | 0.0 | 0.468 |
| 13 | 0.431 | 0.0 | 0.538 |
| 14 | 0.489 | 0.0 | 0.611 |
| 15 | 0.549 | 0.0 | 0.686 |
| 16 | 0.610 | 0.0 | 0.762 |
| 17 | 0.672 | 0.0 | 0.840 |
| 18 | 0.736 | 0.0 | 0.920 |
| 19 | 0.800 | 0.0 | 1.000 |
| "Blocking Probabilities for Proportion of DMMs = 0.3" | | | |
| 0 | 0.050 | 0.050 | 0.050 |
| 1 | 0.026 | 0.015 | 0.030 |
| 2 | 0.015 | 0.003 | 0.020 |
| 3 | 0.017 | 0.0 | 0.024 |
| 4 | 0.026 | 0.0 | 0.037 |
| 5 | 0.040 | 0.0 | 0.057 |
| 6 | 0.060 | 0.0 | 0.085 |
| 7 | 0.084 | 0.0 | 0.121 |
| 8 | 0.115 | 0.0 | 0.164 |
| 9 | 0.151 | 0.0 | 0.216 |
| 10 | 0.192 | 0.0 | 0.274 |
| 11 | 0.237 | 0.0 | 0.339 |
| 12 | 0.287 | 0.0 | 0.410 |
| 13 | 0.340 | 0.0 | 0.485 |
| 14 | 0.395 | 0.0 | 0.565 |
| 15 | 0.453 | 0.0 | 0.647 |
| 16 | 0.513 | 0.0 | 0.733 |
| 17 | 0.574 | 0.0 | 0.820 |
| 18 | 0.636 | 0.0 | 0.909 |
| 19 | 0.700 | 0.0 | 1.000 |
| "Blocking Probabilities for Proportion of DMMs = 0.4" | | | |
| 0 | 0.050 | 0.050 | 0.050 |
| 1 | 0.023 | 0.016 | 0.028 |
| 2 | 0.011 | 0.004 | 0.015 |
| 3 | 0.007 | 0.001 | 0.011 |
| 4 | 0.009 | 0.0 | 0.015 |
| 5 | 0.016 | 0.0 | 0.026 |
| 6 | 0.026 | 0.0 | 0.044 |
| 7 | 0.042 | 0.0 | 0.069 |
| 8 | 0.062 | 0.0 | 0.104 |
| 9 | 0.089 | 0.0 | 0.149 |
| 10 | 0.122 | 0.0 | 0.203 |
| 11 | 0.161 | 0.0 | 0.268 |
| 12 | 0.204 | 0.0 | 0.340 |
| 13 | 0.252 | 0.0 | 0.421 |
| 14 | 0.304 | 0.0 | 0.507 |
| 15 | 0.359 | 0.0 | 0.599 |
| 16 | 0.417 | 0.0 | 0.694 |
| 17 | 0.476 | 0.0 | 0.794 |
| 18 | 0.537 | 0.0 | 0.896 |
| 19 | 0.600 | 0.0 | 1.000 |
| "Blocking Probabilities for Proportion of DMMs = 0.5" | | | |
| 0 | 0.050 | 0.050 | 0.050 |
| 1 | 0.024 | 0.019 | 0.029 |
| 2 | 0.009 | 0.005 | 0.014 |
| 3 | 0.004 | 0.001 | 0.006 |
| 4 | 0.003 | 0.0 | 0.005 |
| 5 | 0.004 | 0.0 | 0.009 |
| 6 | 0.008 | 0.0 | 0.016 |
| 7 | 0.015 | 0.0 | 0.030 |
| 8 | 0.026 | 0.0 | 0.052 |
| 9 | 0.043 | 0.0 | 0.085 |
| 10 | 0.065 | 0.0 | 0.130 |
| 11 | 0.094 | 0.0 | 0.188 |
| 12 | 0.129 | 0.0 | 0.259 |
| 13 | 0.171 | 0.0 | 0.341 |
| 14 | 0.217 | 0.0 | 0.434 |
| 15 | 0.268 | 0.0 | 0.535 |
| 16 | 0.322 | 0.0 | 0.644 |
| 17 | 0.379 | 0.0 | 0.758 |
| 18 | 0.439 | 0.0 | 0.877 |
| 19 | 0.500 | 0.0 | 1.000 |

| "Optimal Radio Mix" | | |
|---|---|---|
| Proportion of DMMs | No. of Digital Radios | System Blocking |
| 0.0 | 0 | 0.050 |
| 0.1 | 1 | 0.040 |
| 0.2 | 2 | 0.027 |
| 0.3 | 2 | 0.015 |
| 0.4 | 3 | 0.007 |
| 0.5 | 4 | 0.003 |

Note:
DMM stands for dual-mode mobile.

The techniques herein permit the design of cellular systems with a maximum load determined that can be handled with a specified blocking probability. It can be determined how to select the available frequencies at a cell between analog and digital radios to achieve maximum capacity.

System blocking probabilities are plotted along the ordinate. The number of digital radios is plotted on the abscissa The plotted curves on the chart each are specified by the number of dual-mode mobiles in the service area. The effect of various mixes may be advantageously to minimize system blocking.

Figure 4:
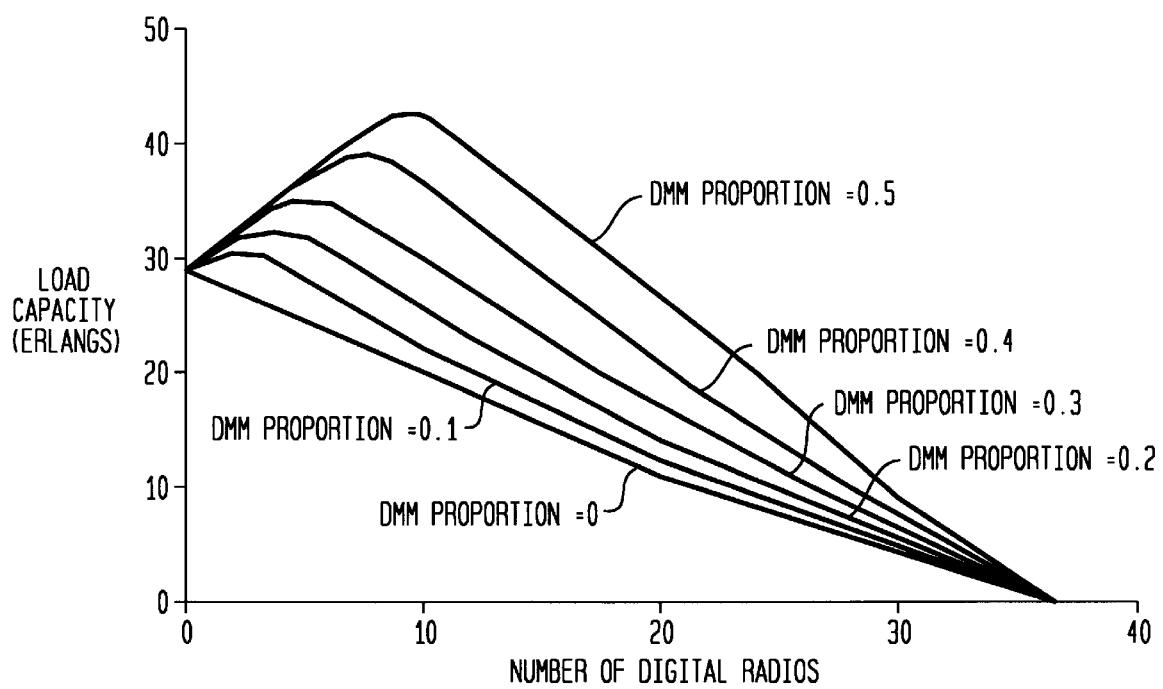

The charts of FIGS. 3 and 4 plot load capacity (ordinate) vs the digital radios (abscissa) in the system. The line plots each representing a specific proportion of dual-mode mobiles and how each plot defines an optimum load capacity. The method permits the generation of capacity charts such as shown in FIG. 2 which is keyed to a specific blocking probability. This chart shows the relation between load capacity, the number of digital radios and and the proportion represented by the dual-mode mobiles.

The invention claimed is:

1. A method of partitioning of analog and digital base station radios in a cell area serving a given proportion of both dual-mode digital/analog mobiles and solely analog mobiles to achieve maximum capacity, the method comprising:

determining blocking probabilities experienced by analog mobiles;

determining blocking probabilities experienced by dual-mode mobiles;

determining blocking probabilities experienced by a sum of analog and dual-mode mobiles; and arranging numbers of digital and analog radios at the base station to achieve the maximum capacity.

2. A method of determining a mix of analog and digital base station radios for a cell serving both dual-mode and analog mobiles each having a specified blocking probability, the method comprising the steps of:

determining blocking probabilities for dual-mode mobiles, analog mobiles and the combined analog/dial mode mobiles;

determine the proportion of analog and digital radios;

provide the proportion of analog and digital radios at the base station to provide a desired cell capacity to minimize overall cell blocking probability.

3. The method of claim 2, wherein:

analog blocking probability is determined by an equivalent random method.

4. The method of claim 2, wherein:

blocking probability calculations include calculation of a mean, a variance and a peakedness factor.

5. The method of claim 2 in which an approximate computation of the analog blocking probability is obtained by the steps of:

computing α a and v; where, $$\alpha = \alpha_D + a_A$$

and, $$v = v^D + a_A$$

where $\alpha_D$ and $v_D$ are the mean and variance of the digital overflow, their values are given by $$\alpha_D = a_D B(s_D, a_D)$$

$$v_D = \alpha_D \left(1 - \alpha_D + \frac{a_D}{s_D + 1 + \alpha_D - a_D}\right)$$

Computing z; where, $$z = \frac{v}{\alpha}$$

compute a; where, $$a = v + 3z(z-1)$$

Find s; where, $$s = \frac{a(\alpha + z)}{\alpha + z - 1} - \alpha - 1$$

Find an integer value for s by truncating the value computed in finding s to its integer value;

compute a new value for a in terms of an integer values for s and z;

$$a = \frac{(s + \alpha + 1)(\alpha + z - 1)}{\alpha + z}$$

having obtained values for s and a, $B_A$ is computed using;

$$B_A = \frac{B(s + s_A, a)}{B(s, a)}$$

with $B_A$ and $B_D$ known, one can find the probabilities $P_A$, $P_D$, and $P_S$ using equations $$P_A = B_A$$

$$P_D = B_A B_D$$

$$P_S = \frac{(\alpha_D + a_A)B_A}{a_D + a_A} = \frac{(a_D B_D + a_A)B_A}{a_D + a_A}$$

$$B_A = \frac{B(s + s_A, a)}{B(s, a)}$$

6. The method of claim 2, further including the step of:

determining offered loads from dual-mode and analog mobile populations in real time and assigning digital and analog radios to the cell in order to minimize blocking.

7. The method of claim 2, further including the step of:

determining in real time the proportion of each type of mobile and assigning digital and analog radios to the cell in order to maximize capacity, preparing line plots of a specific proportion of a type mobile for examining how a plot defines an optimum load capacity.

* * * * *